United States Patent
Bagherjeiran et al.

(10) Patent No.: US 10,891,653 B1
(45) Date of Patent: Jan. 12, 2021

(54) APPROACHES FOR RETRIEVAL OF ELECTRONIC ADVERTISEMENTS

(71) Applicant: A9.com, Inc., Palo Alto, CA (US)

(72) Inventors: Abraham Hossain Bagherjeiran, Sunnyvale, CA (US); Kartheekeya Datta Kasibatta, Sunnyvale, CA (US); Chein-Hsin Liu, Santa Clara, CA (US); Ankit Malpani, Santa Clara, CA (US)

(73) Assignee: A9.COM, INC., Palo Alto, CA (US)

( * ) Notice: Subject to any disclaimer, the term of this patent is extended or adjusted under 35 U.S.C. 154(b) by 789 days.

(21) Appl. No.: 14/657,715

(22) Filed: Mar. 13, 2015

(51) Int. Cl.
*G06Q 30/02* (2012.01)
*G06F 16/951* (2019.01)

(52) U.S. Cl.
CPC ....... *G06Q 30/0256* (2013.01); *G06F 16/951* (2019.01)

(58) Field of Classification Search
CPC .............. G06F 17/30501; G06Q 30/02; G06Q 30/0251
See application file for complete search history.

(56) References Cited

U.S. PATENT DOCUMENTS

| | | | | |
|---|---|---|---|---|
| 2011/0225038 | A1* | 9/2011 | Fontoura | G06Q 30/02 705/14.49 |
| 2014/0278981 | A1* | 9/2014 | Mersov | G06Q 30/02 705/14.53 |
| 2015/0193486 | A1* | 7/2015 | Moataz | H04L 9/00 707/741 |
| 2015/0193811 | A1* | 7/2015 | Lei | G06Q 30/0242 705/14.41 |
| 2016/0180402 | A1* | 6/2016 | Sabah | G06F 16/285 705/14.66 |

OTHER PUBLICATIONS

See Wiley Encyclopedia of Computer Science and Engineering (2009) at least p. 125. Transaction Processing.*
Wiley Encyclopedia of Computer Science and Engineering (2009) p. 1-3, 1971-1980 (Year: 2003).*

* cited by examiner

*Primary Examiner* — Arthur Duran
*Assistant Examiner* — Breffni Baggot
(74) *Attorney, Agent, or Firm* — Hogan Lovells US LLP

(57) ABSTRACT

An advertising system can be configured to determine advertisements that are responsive to targeting segments included in advertisement requests without having to individually evaluate Boolean or logical targeting expressions associated with each advertisement. For example, the advertising system can be configured to determine, for advertisements, one or more terms that correspond to at least a portion of the respective targeting expressions of the advertisement. When an advertisement request is received, a determination can be made as to whether any of the segments (e.g., age group) associated with that request correspond to any of the terms that were derived from the advertisements. The advertisement system can then determine any advertisements that match the term(s) that correspond to the request. The advertising system can determine the most relevant advertisement based on various criteria, and an advertisement can be provided in response to the advertisement request, for example, upon conducting an electronic auction.

18 Claims, 13 Drawing Sheets

APPROACHES FOR RETRIEVAL OF ELECTRONIC ADVERTISEMENTS

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

Advertisement selection can be performed through electronic auctions that may be held through an electronic advertisement exchange ("ad exchange"). Typically, content publishers ("publishers") can create opportunities for displaying electronic advertisements with their content (e.g., web pages). Publishers can provide such opportunities independently or be represented by an advertisement network ("ad network"). For example, when a user accesses a website of a publisher, the server hosting the website can send an advertisement request to the ad exchange. This request may include information describing the website, publisher, and/or the user. Once the request is received by the ad exchange, advertisers can bid to fill that request with their advertisement.

Advertisers can utilize advertising campaigns ("ad campaign") that define various criteria for bidding on an ad request, such as data (e.g., user attributes, categories, etc.) describing an audience targeted by the ad campaign, duration of the ad campaign, geographic locations and/or ad networks to which their ads are provided, maximum bid prices, etc. Such information can be utilized by various bidding algorithms to determine whether an advertiser bids on the auction depending on the contextual information (e.g., descriptions of a user and/or publisher) that is included with the ad request. Once a winner is determined, the advertisement ("ad") designated by the winning advertiser is then provided in response to the request and, subsequently, displayed to the user on the website of the publisher. The displaying of the ad is counted as an "impression."

Generally, advertisements can be associated with Boolean expressions. Such expressions can be a series of logical statements that represent various targeting criteria. These Boolean expressions can be evaluated, for example, by an advertising system, with respect to any attributes of a user for which an ad request is received. For example, an advertisement that is targeting users who are both male and are interested in photography may be associated with the Boolean expression "male AND photography." If the contextual information included with the ad request indicates that the user is associated with the segment "male" and the segment "photography," then the Boolean expression "male AND photography" for the advertisement is satisfied, and the advertisement can be included in an electronic auction for the ad request or provided as an impression.

BRIEF DESCRIPTION OF THE DRAWINGS

Various embodiments in accordance with the present disclosure will be described with reference to the drawings, in which.

DETAILED DESCRIPTION

Figure 1:
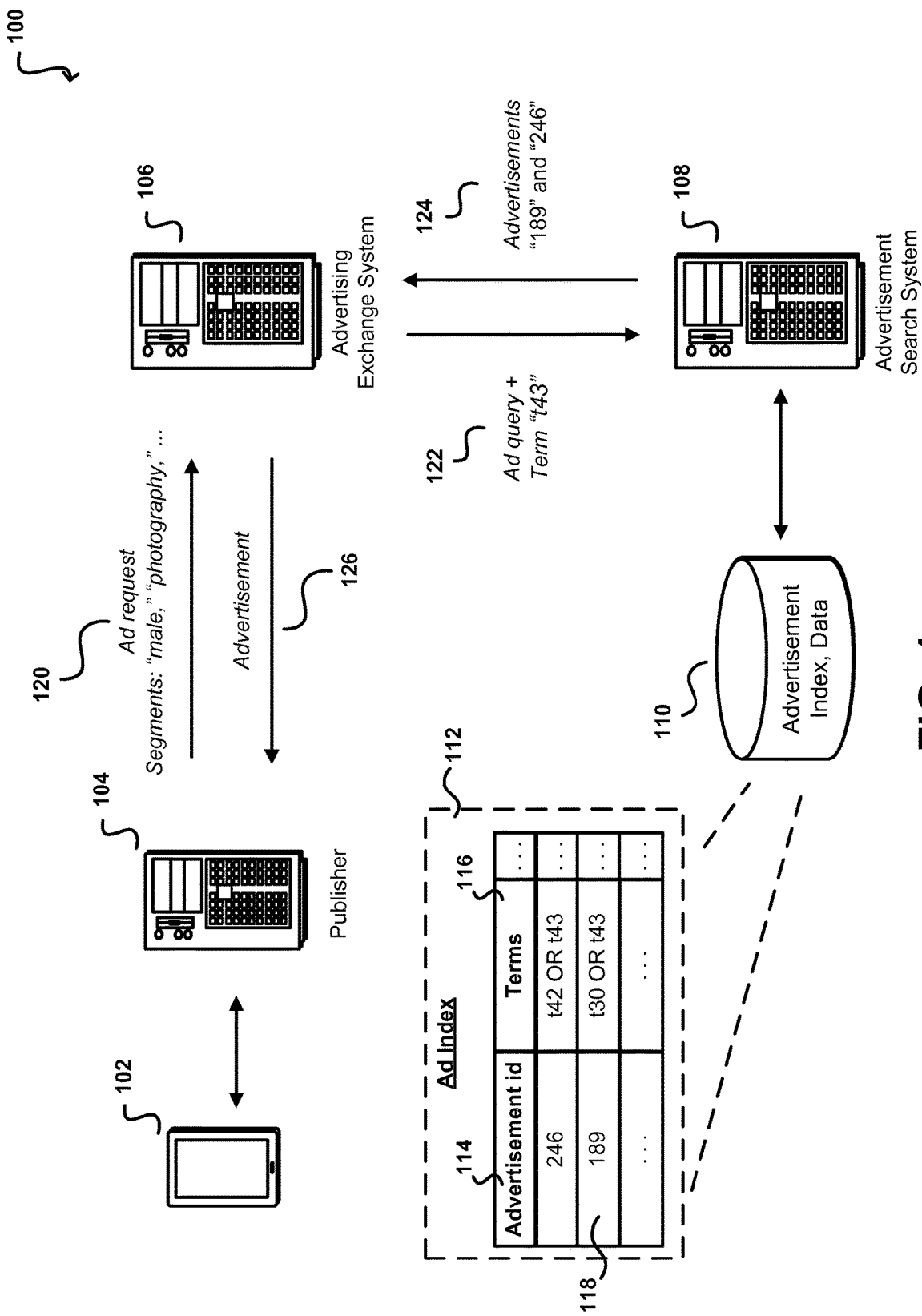
FIG. 1 illustrates an example environment for implementing aspects in accordance with various embodiments.

As mentioned, electronic advertisements can be associated with various targeting expressions (e.g., Boolean expressions) which may be made up of logical statements formed using various behavioral and/or user segments that are shared among the target audience. Such segments may be used to describe various attributes of users such as gender, age group, interests, demographics, content or types of content recently accessed by the user, etc. When an ad request is generated, for example, in response to a user accessing content on a website of a publisher, the computing system of the publisher can send the ad request to an advertisement system, along with any segments that correspond to the user.

To determine advertisements that are responsive to these segments, the advertising system can individually evaluate each of the segments included with the ad request with respect to the respective targeting expressions associated with advertisements that are available to be served by the advertising system. The process of evaluating segments included in the ad request with respect to targeting expressions for each advertisement can be computationally expensive depending on the number of segments in the ad request and the complexity of the targeting expressions. Given such constraints, conventional advertising systems are typically limited in the number of advertisements that they are capable of serving.

Accordingly, systems and methods in accordance with various embodiments of the present disclosure overcome one or more of the above-described deficiencies and other deficiencies in conventional approaches to electronic advertising. In various embodiments, an advertising system (e.g., an ad exchange system) can be configured to interact with an advertisement search system to obtain advertisements that are responsive to an ad request. Such an approach allows for the advertisement search system to quickly evaluate segments included in an ad request with respect to targeting expressions for advertisements to determine which advertisements are responsive to the ad request. In various embodiments, the advertisement search system is able to determine the responsive advertisements without having to explicitly evaluate the Boolean targeting expressions that are typically associated with advertisements. In some implementations, the advertisement search system can determine, for advertisements, one or more terms that describe the respective targeting expression of the advertisement. That is, the Boolean targeting expression associated with the advertisement can be deconstructed or transformed into one or more terms that describe portions of the Boolean targeting expression.

When an ad request is received, segments (e.g., demographics, gender, age, etc.) associated with that request are used to determine whether the segments correspond to any of the terms that were derived from the respective targeting expressions of the advertisements. For example, a targeting expression "female AND photography" associated with advertisements may be associated with the term "t83." If the segments received with the ad request satisfy the targeting expression (e.g., segments "female" and 37 photography), then the ad request can be associated with the term "t83." The advertisement search system can then determine any advertisements that match the term "t83" as being responsive to the ad request. In various embodiments, the advertisement search system can send the most relevant advertisement, for example, based on various criteria such as the size of the advertisement slot, pacing, ranking, frequency caps, to the advertising system, along with other information (e.g., bid price for the advertisement), and an advertisement can be provided in response to the ad request, for example, upon conducting an electronic auction.

Other advantages, variations, and functions are described and suggested below as may be provided in accordance with the various embodiments.

FIG. 1 illustrates an example environment 100 for implementing aspects in accordance with various embodiments. The example environment 100 illustrates a user operating a computing device 102 to electronically access content (e.g., a website or web page) from the publisher 104. Upon determining that the computing device 102 is accessing content, the publisher 104 can send, to an advertising system ("ad system") 106, a request 120 for an advertisement to be provided to the computing device 104 along with the content being accessed. The ad system 106 may operate as an advertising exchange that is configured to process advertising requests received from various publishers, for example.

The request 120 can include information about the user operating the computing device 102, such as any behavioral or user segments that may describe various attributes of the user including, for example, demographics, gender, age, purchase history of products and/or services from various sources, any web content that is browsed or accessed by the user, advertisements or content in which the user demonstrated interest (e.g., through clicks, conversions, etc.), among other information. The ad system 106 can use such information to identify or obtain advertisements that are responsive to the segments provided with the request and, as a result, identify or obtain advertisements that are determined to be most relevant to the user operating the computing device 102.

In various embodiments, the advertising system 106 can be configured to convert or transform any segments included in the request 120 into one or more terms. For example, the segments "male" and "photography" included in the ad request may be transformed into a term "t43." The advertising system 106 can generate a query 122 that references the term "t43" and can send the query 122 to an advertisement search system ("search system") 108. The search system 108 can access an index 112 that is stored, for example, in a data store 110, to determine any advertisements that are associated with the term "t43." Although the example of FIG. 1 describes the request 120 as including behavioral or user segments of the user, in some embodiments, the request 120 can reference user information (e.g., a user identifier) and such information can be used to obtain additional details about the user (e.g., behavioral and/or user segments). For example, the user information may reference a user identifier that can be used to access or obtain a digital profile corresponding to the user. Further, this digital profile may store information about the user being targeted by the advertisements, such as behavioral and/or user segments describing various attributes of the user. These segments may have been determined to correspond to the user based on various actions taken by the user (e.g., content accessed, advertisements clicked, conversions resulting from advertisement clicks, web browsing history, etc.).

As mentioned, advertisements may be associated with various Boolean targeting expressions made up of logical statements that are formed using various segments. In various embodiments, the targeting expressions of advertisements can be converted or transformed into one or more terms that describe the respective targeting criteria of an advertisement. That is, the Boolean targeting expression associated with the advertisement can be deconstructed or transformed into one or more terms that can describe portions of the Boolean targeting expression. In the example of FIG. 1, the index 112 associates advertisement identifiers 114 that reference advertisements and any respective terms 116 corresponding to the advertisement identifiers 114. As mentioned, the terms 116 for an advertisement can be derived from any targeting expressions associated with the advertisement.

In this example, the index 112 is depicted as associating the advertisement, or advertisement identifier, "246" to the terms "t42" or "t43" and the advertisement, or advertisement identifier, "189" to the terms "t30" or "t43." In FIG. 1, the search system 108 can utilize the index 112 to determine that advertisements "189" and "246" are responsive to the term "t43" that is referenced by the ad query 122. In various embodiments, the search system 108 can send the advertisements, or advertisement identifiers, 124 along with other information (e.g., respective bid prices for the advertisements) to the advertising system 106, and the advertising system 106 can determine the advertisement 126 to be provided in response to the ad request 120, for example, upon conducting an electronic auction. In various embodiments, the advertisements, or advertisement identifiers, 124 provided by the search system 108 can each be associated with a respective score, depending on the implementation, such scores can be used to rank and/or determine respective bid prices for the advertisements.

In FIG. 1, the publisher 104, the advertising system 106, and the search system 108 are able to utilize respective computing systems and/or devices to interact with one another through a network, for example, a local area network (LAN) or wide area network (WAN), e.g., the Internet. Similarly, users are able to utilize their respective computing devices 102 to access content (e.g., websites) that may be offered through the publisher 104 over the network. Such publishers 104 can provide content (e.g., web pages, etc.) that is accessible over the network (e.g., the Internet). For example, a publisher 104 may utilize one or more computing systems to provide a website that is accessible through the network. The publisher's website may offer opportunities to present additional content to users accessing the website, for example, in the form of electronic advertisements. The computing devices and/or systems for each of the computing device 102, publisher 104, advertising system 106, and search system 108 will each generally include memory for storing instructions and data, and at least one processor for executing the stored instructions. The advertising system 106 and the search system 108 are illustrated as being implemented on separate computing systems, however, in some embodiments, the advertising system 106 and the search system 108 can be implemented within the same computing system.

Figure 2:
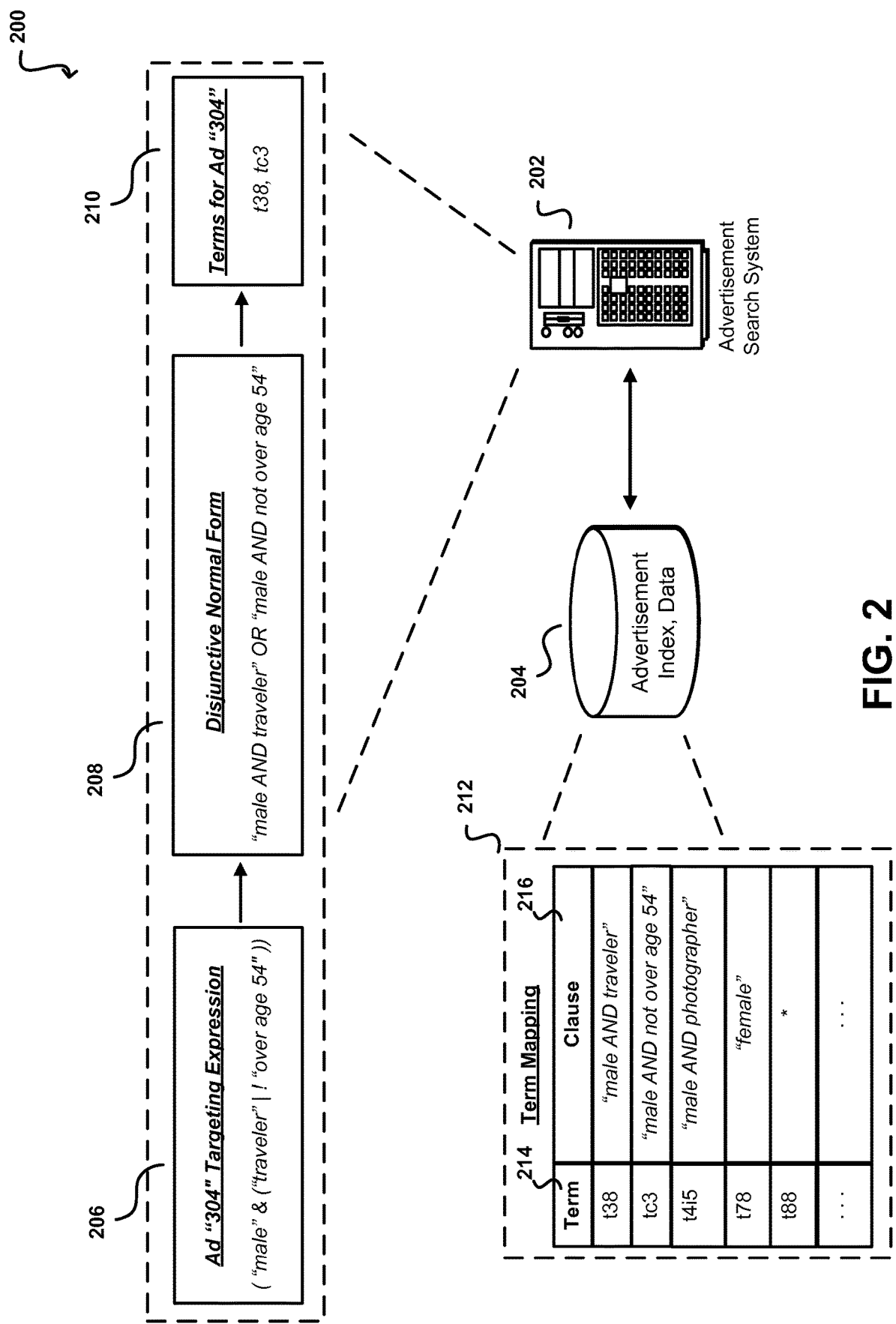
FIG. 2 illustrates an example approach for generating an advertisement index in accordance with various embodiments.

FIG. 2 illustrates an example approach 200 for generating an advertisement index in accordance with various embodiments. FIG. 2 illustrates the advertisement search system ("search system") 202 that was described in reference to FIG. 1. The search system 202 can communicate with a data store 204 that stores data describing various advertisements. Such data can include advertisements, or references to the advertisements, along with information related to the advertisements such as respective targeting expressions, bid price information, ranking scores, size (e.g., pixel dimensions) of the advertisement, the number of bids, clicks, and/or purchases, for example, resulting from the advertisement being presented, frequency caps, and/or pacing information, to name some examples.

The search system 200 can generate an advertisement index, such as the advertisement index 112 as described in reference to FIG. 1, for example. When generating or updating the index with new advertisement information, the search system 200 can associate advertisements with one or more terms as determined using the respective targeting expressions of those advertisements, for example. As mentioned, a term can reference or correspond to a portion of a targeting expression. For example, the term "ti81" may correspond to the Boolean logical statement "female AND aged 25-35." In other words, the terms can be pseudo-words or tokens that are generated and each term can, in general, correlate to a specific portion of the logical statement.

To generate the terms, the search system 200 can evaluate respective targeting expressions of some or all of the advertisements that are available in the data store 204, for example. The targeting expression, or the logical statement, for each advertisement can be converted to determine a disjunction of conjunctions, such as by standardizing the targeting expression into a disjunctive normal form (DNF). For example, as illustrated in FIG. 2, the search system 202 is shown as converting the targeting expression 206 for an advertisement "304" into disjunctive normal form 208. As shown, the logical statement targets males that are interested in traveling or males that are not over the age of 54, which is formulated as "(male & (traveler|! over age 54))." This logical statement is then rewritten in disjunctive normal form as "male AND traveler OR male AND not over age 54." In this example, the logical statement in disjunctive normal form forms two AND clauses: "male AND traveler" and "male AND not over age 54." Accordingly, the ad "304" would be responsive if an ad request included the segments "male" and "traveler" and/or "male" and "not over age 54." In various embodiments, each AND clause is mapped or transformed 210 into a corresponding term corresponding to that AND clause. In this example, the search system 202 utilizes the term-to-clause mapping table or dictionary 212 to determine that the clause "male AND traveler" corresponds to the term "t38" and the clause "male AND not over age 54" corresponds to the term "tc3." Targeting expressions for advertisements need not always include a logical statement. For example, some advertisements may target just one advertising segment (e.g., "females" or "males"). In some instances, some advertisements may target all users regardless of whether or not such users correspond to a particular advertising segment or segments. In instances where an advertisement is associated with individual advertising segments (e.g., "female"), respective terms corresponding to such individual ad segments (e.g., "t78") can be associated with the advertisement and subsequently utilized to obtain such advertisements through the search system 202. In instances where an advertisement targets all users, a term (e.g., "t88") indicating such targeting criteria can be associated with the advertisement and subsequently utilized to obtain such advertisements through the search system 202. In various embodiments, advertisements that target all users can be associated with respective pacing constraints that can be used to regulate how often the advertisements are provided in response to a query.

The search system 202 can repeat this process for some or all of the advertisements that are available to be served or stored in the data store 204. Once this process is complete, the associations between advertisements and respective terms can be utilized as an index for determining advertisements that are responsive to any terms that are referenced in an ad query, such as the ad query 122 as described in reference to FIG. 1.

FIGS. 3(a)-(d) illustrate an example approach 300 for generating an advertisement search query in accordance with various embodiments. FIG. 3 illustrates the advertising system ("ad system") 302, for example, the advertising system 106 that was described in reference to FIG. 1. As mentioned, the ad system 302 can receive advertisement requests 304, for example, from computing systems of publishers. An ad request 304 may include, for example, various information about a user being targeted with advertisements such as behavioral or user segments 306 describing various attributes. Each segment may indicate some information relating to user demographics, gender, age, among other information. The ad system 302 can use such information to identify or obtain advertisements that are responsive to the segments provided with the request.

In various embodiments, the ad system 302 can be configured to convert or transform any segments 306 included in the request 304 into one or more terms 308. For example, the ad system 302 may determine that the segments "male" and "traveler" included in the ad request 304 satisfy the logical statements ("male AND traveler") associated with the term "t38" and, based on this determination, include the term "t38" in the generated ad query 310. Similarly, the ad system 302 may determine that the segments "male" and "age 25-35" included with the ad request 304 satisfy the logical statements ("male AND not over age 54") associated with the term "tc3" and, based on this determination, include the term "tc3" in the ad query 310. As mentioned, the ad query 310 can be submitted to the search system, as described above, to retrieve advertisements that are responsive to the terms in the ad query 310.

Figure 3A:
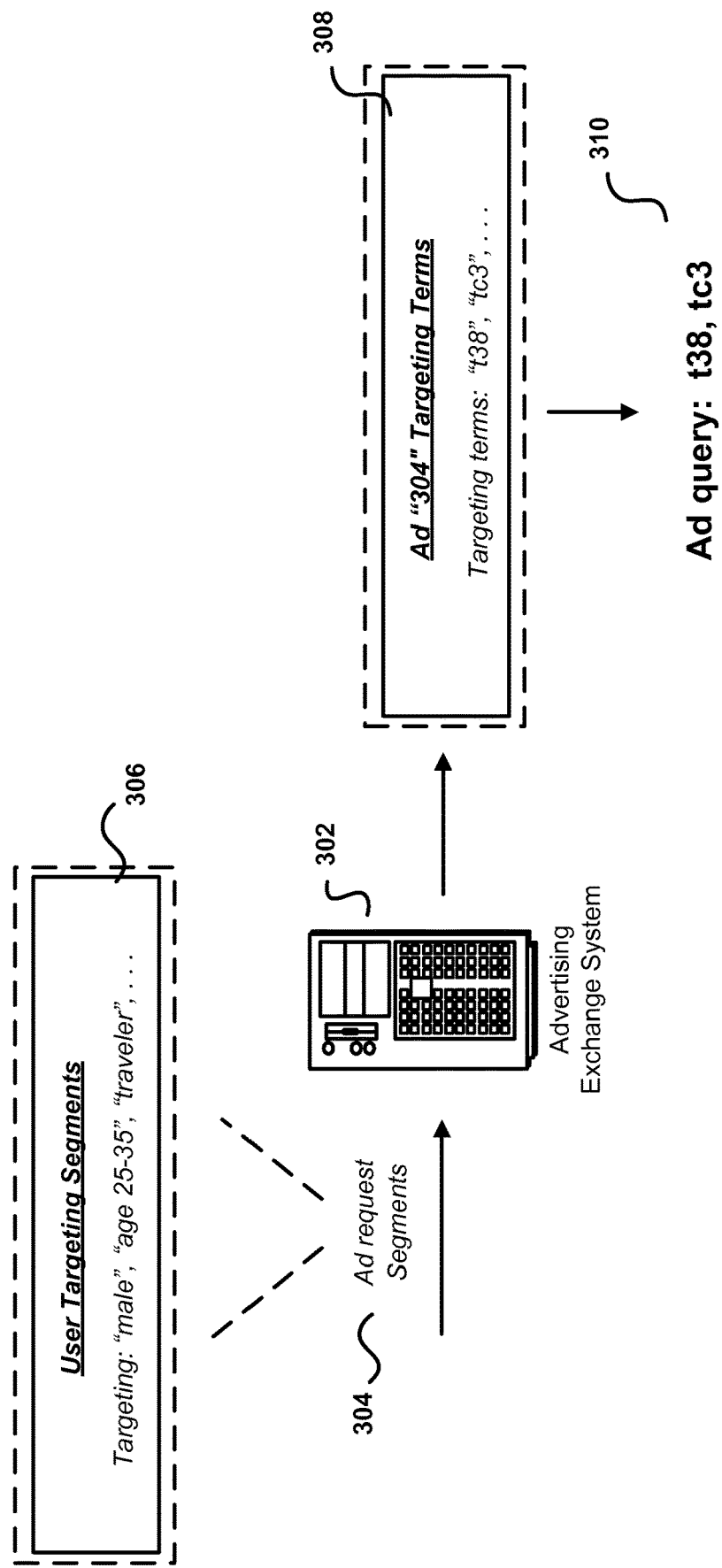
FIGS. 3(a)-(d) illustrate an example approach for generating an advertisement search query in accordance with various embodiments.
Figure 3B:
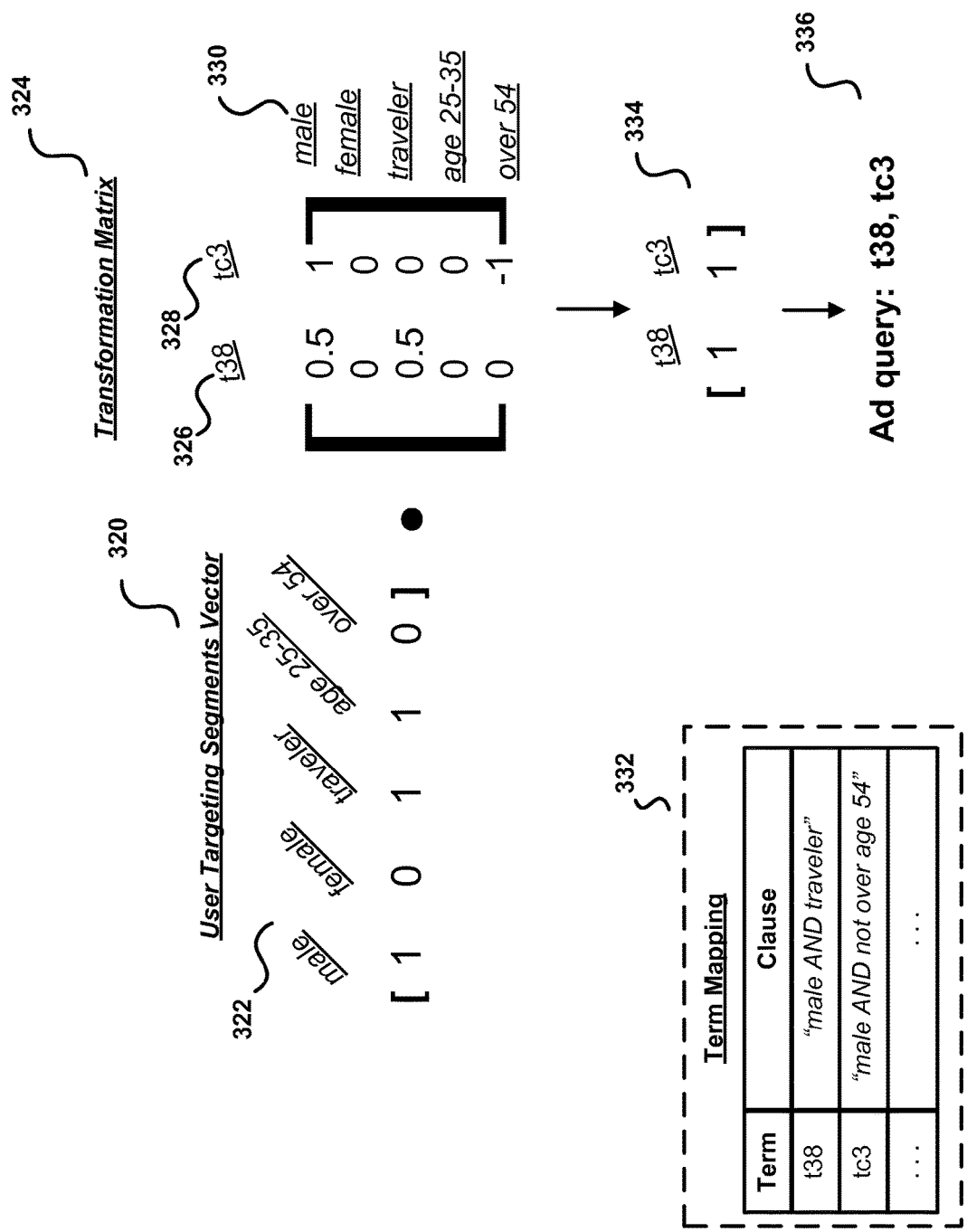
Figure 3C:
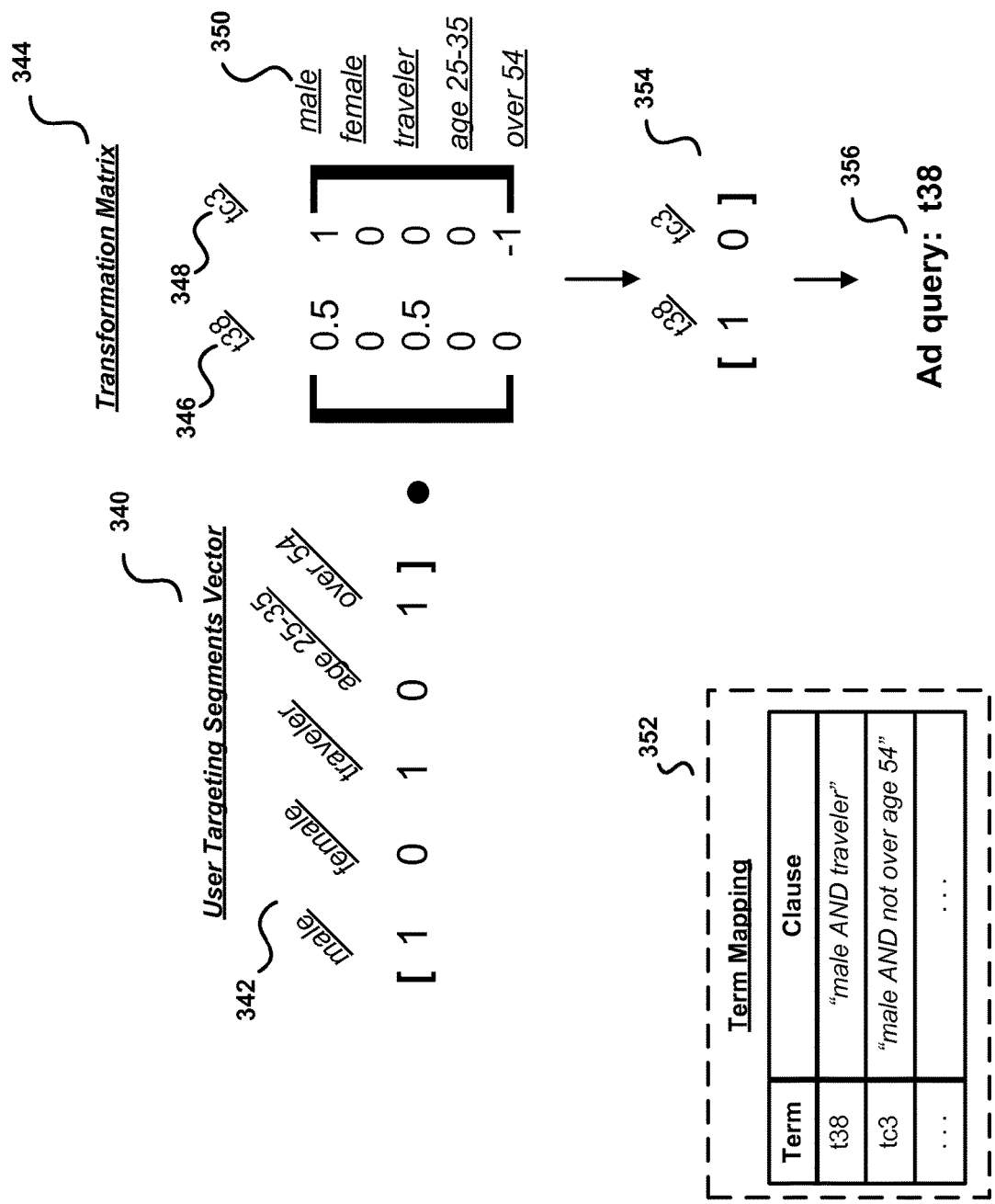

As illustrated in the example of FIG. 3(b), in various embodiments, determining the ad query 310 from the segments 306 included with the ad request 304 involves determining a vector 320 indicating which segments were included in the ad request 304. As shown in this example, the vector 320 has respective elements 322 that correspond to segments. The elements corresponding to any segments that appeared in the ad request are set to "1" and the elements corresponding to any segments that did not appear in the ad request are set to "0." In this example, the ad request 306 included the segments "male," "age 25-35," and "traveler" and, therefore, the respective elements corresponding to the segments "male," "age 25-35," and "traveler" in the vector 320 are set to "1" while the remaining elements are set to "0". The vector 320 is provided merely for purposes of explanation and, depending on the implementation, the size of the vector can vary depending on the number of segments that are active or available for targeting. The vector will typically include respective elements for each segment that is active or available for targeting.

A transformation matrix 324 can also be determined based on the various Boolean targeting expressions or logical statements that were evaluated for the advertisements, as described above in reference to FIG. 2, to determine the terms corresponding to those advertisements. Generally, the transformation matrix 324 is a mathematical representation of the Boolean targeting expressions or logical statements that were mapped or transformed into terms. The transformation matrix can include a column entry for each term that was determined from evaluating the advertisements. The transformation matrix can also include a row entry for each segment that is active or available for targeting.

In the example of FIG. 3(*b*), the transformation matrix 324 includes respective column entries 326, 328 for the terms "t38" and "tc3." The transformation matrix 324 also includes respective row entries 330 for each of the available segments "male," "female," "traveler," "age 25-35," and "over age 54." As mentioned, the respective targeting expressions or logical statements corresponding to the terms can be encoded or mathematically represented using the transformation matrix 324. For example, according to the term-to-clause mapping table 332, the term "t38" corresponds to the targeting expression "male AND traveler." In various embodiments, for each term 326, 328 entry, all positive segments in the column 326, 328 are defined so the sum of the positive segments normalizes to "1". Similarly, all negative segments in the column 326, 328 are defined so the sum of the negative segments normalizes to "−1".

For any given term, a segment is identified as being positive if that segment is required to be present in the ad request in order for the targeting expression associated with that term to be satisfied. For example, the term "t38" 326 is associated with two positive segments "male" and "traveler," which are both required for the logical statement "male AND traveler" to be satisfied. Since there are two positive terms associated with the term "t38," the respective elements corresponding to the segment "male" and the segment "traveler" are both set to "0.5" in the matrix 324.

Further, for any given term, a segment is identified as being negative if that segment is required to not be present in the ad request in order for the targeting expression associated with that term to be satisfied. For example, the term "tc3" 328 is associated with one positive segment "male" and one negative segment "not over age 54" which are both required for the logical statement "male AND not over age 54" to be satisfied. Since there is one positive segment associated with the term "tc3," i.e., "male", the respective element corresponding to the segment "male" is set to "1" in the matrix 324. Further, since there is one negative segment associated with the term "tc3," i.e., "not over age 54," the respective element corresponding to the segment "over age 54" is set to "−1" in the matrix 324. Naturally, if there were two negative segments associated with the term "tc3," then the respective elements corresponding to the negative segments would each be set to "−0.5" in the matrix.

To determine whether the segments in the ad request match any terms, the ad system 302 can determine a product of the vector 320 and the transformation matrix 324. The result 334 of the product indicates whether the segments match any terms. In various embodiments, the result 334 includes respective elements that correspond to each of the terms 326, 328 in transformation matrix 324. In some embodiments, if the element corresponding to the term in the result 334 has at least a value of "1," then that term is determined to match the segments in the ad request. Otherwise, if the element corresponding to the term in the result 334 is less than "1," then that term is determined not to match the segments in the ad request. In this example, both of the targeting expressions for both of the terms "t38" and "tc3" are satisfied by the segments included in the ad request, as represented by the vector 334. The matching terms, e.g., "t38" and "tc3," can then be included in the ad query 336 to be used for obtaining advertisements that are responsive to the terms.

FIG. 3(*c*) illustrates another example for determining the ad query from the segments included with the ad request. In FIG. 3(*c*), a vector 340 indicating which segments were included in the ad request is determined. In this example, the vector 340 has respective elements 342 that correspond to segments. The elements corresponding to any segments that appeared in the ad request are set to "1" and the elements corresponding to any segments that did not appear in the ad request are set to "0." In this example, the ad request included the segments "male," "over age 54," and "traveler." Thus, the respective elements corresponding to the segments "male," "over age 54," and "traveler" in the vector 340 are set to "1" and the remaining elements are set to "0".

A transformation matrix 344 can also be determined based on the various Boolean targeting expressions or logical statements that were evaluated for the advertisements, as described above in reference to FIG. 2, to determine the terms corresponding to those advertisements. As mentioned, the transformation matrix 344 can be a mathematical representation of the Boolean targeting expressions or logical statements that were mapped or transformed into terms.

In the example of FIG. 3(*c*), the transformation matrix 344 includes respective column entries 346, 348 for the terms "t38" and "tc3." The transformation matrix 344 also includes respective row entries 350 for each of the available segments "male," "female," "traveler," "age 25-35," and "over age 54." As mentioned, the respective targeting expressions or logical statements corresponding to the terms can be encoded or mathematically represented using the transformation matrix 344. For example, according to the term mapping table 352, the term "t38" corresponds to the targeting expression "male AND traveler." In various embodiments, for each term 346, 348 entry, all positive segments in the column 346, 348 are defined so the sum of the positive segments in the column normalizes to "1". Similarly, for each column, all negative segments in the column 346, 348 are defined so the sum of the negative segments normalizes to "−1".

In FIG. 3(*c*), for example, the term "t38" 346 is associated with two positive segments "male" and "traveler," which are both required for the logical statement "male AND traveler" to be satisfied. Since there are two positive terms associated with the term "t38," the respective elements corresponding to the segment "male" and the segment "traveler" are both set to "0.5" in the matrix 344. Further, the term "tc3" 348 is associated with one positive segment "male" and one negative segment "not over age 54" which are both required for the logical statement "male AND not over age 54" to be satisfied. Since there is one positive segment associated with the term "tc3," i.e., "male", the respective element corresponding to the segment "male" is set to "1" in the matrix 344. Further, since there is one negative segment associated with the term "tc3," i.e., "not over age 54," the respective element corresponding to the segment "over age 54" is set to "−1" in the matrix 344.

To determine whether the segments in the ad request match any terms, the ad system 302 can determine a product of the vector 340 and the transformation matrix 344. The result 354 of the product indicates whether the segments match any terms. In various embodiments, the result 354 includes respective elements that correspond to each of the terms 346, 348 in transformation matrix 344. As mentioned, in some embodiments, if the matrix entry corresponding to the term in the result 354 has at least a value of "1," then that term is determined to match the segments in the ad request. Otherwise, if the matrix entry corresponding to the term in the result 354 is less than "1," then that term is determined not to match the segments in the ad request. In this example, the targeting expression for the term "t38" (e.g., "male AND traveler") is satisfied by the segments included in the ad request, since the corresponding matrix entry for the term in the result 354 is "1." However, the targeting expression for the term "tc3" (e.g., "male AND not over age 54") is not satisfied by the segments, since the corresponding matrix entry for the term in the result 354 is "0." Thus, the matching term "t38," and not "tc3," can then be included in the ad query 356 to be used for obtaining advertisements that are responsive to the terms.

Figure 3D:
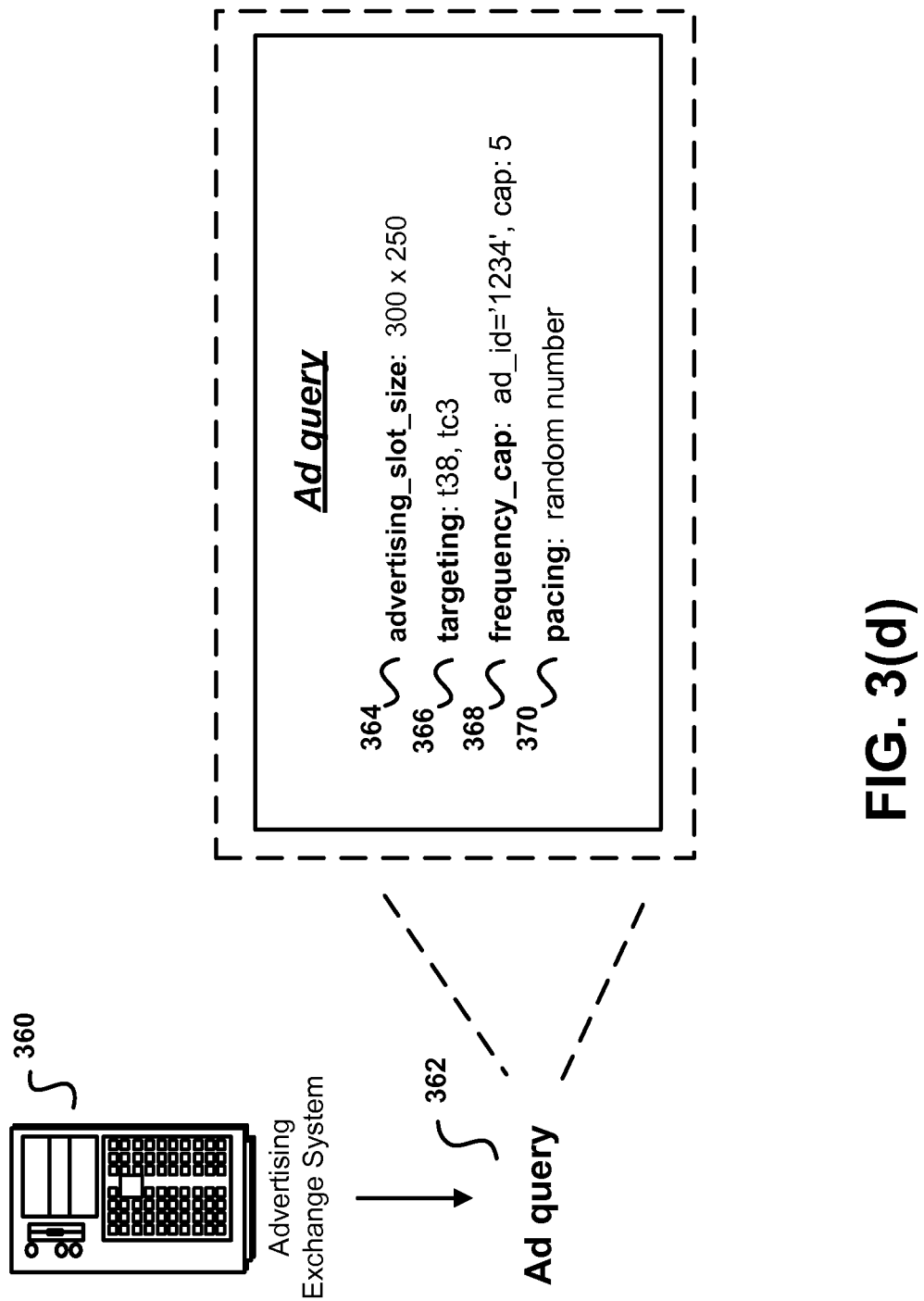

FIG. 3(d) illustrates another example for determining the ad query. In the example of FIG. 3(d), the ad system 360 has determined the ad query 362, as described above in reference to FIG. 3(c). In various embodiments, the ad query 362 can include additional parameters 366, 368, 370, 372 that can be utilized by the search system, as described above, to retrieve and advertisements that are responsive to the ad query 362.

For example, the ad query 362 is illustrated as including information 364 describing the size of the advertising slot for which an advertisement is to be fitted. The size of the advertising slot can typically be provided by the computing device of the publisher as part of the advertisement request. The search system can utilize the information 364 in the ad query 362 when determining which advertisements are responsive to the targeting terms 366 (e.g., t38, tc3) and that also satisfy the sizing (e.g., pixel size) requirements specified by the information 364.

The ad query 362 can optionally include information 368 identifying or describing any frequency caps associated with advertisements. A frequency cap can be used to control the number of times an advertisement is returned from the search system as being responsive to the ad query 362. In some embodiments, the information 368 specifies the number of impressions for an advertisement, or advertisement identifier, and the search system is able to determine, based on any frequency caps (e.g., maximum number of impressions) associated with that advertisement, or advertisement identifier, whether or not that advertisement is responsive. In some embodiments, the information 368 specifies the respective frequency caps associated with an advertisement, or advertisement identifier, in the query 362 and the search system is able to determine, based on a number of impressions corresponding to the advertisement, or advertisement identifier, whether to return the advertisement or advertisement identifier in response to the query 362.

In various embodiments, the ad system and/or the search system can be configured to regulate the delivery of advertisements that are associated with pacing constraints. For example, an advertiser may purchase 7,000 impressions for an advertising campaign that runs for one week. The advertiser may prefer to spread the 7,000 impressions across the one week advertising campaign evenly (e.g., 1,000 impressions per day), or within some threshold proportion spread across the week. Pacing can be implemented to address such constraints so that, for example, all 7,000 impressions are not satisfied prior to completion of the one week advertising campaign. In some implementations, a pacing factor for an advertisement can be utilized to pace the delivery of the advertisement. The pacing factor may be stored, for example, in the search index or in a data store. The pacing factor indicates a probability that the advertisement should be returned or delivered in response to an ad request. Generally, the pacing factor for an advertisement that is not associated with any pacing constraints is set to "1," which means the advertisement is always returned if determined to be responsive to an ad request. However, if the delivery of an advertisement is exceeding the pacing constraints, then the pacing factor can be manipulated to reduce the delivery of the advertisement. For example, to reduce the return rate for an advertisement to 10 percent, the pacing factor can be set to "0.1".

To implement pacing, a random number 370 between "0" and "1" can be included in the ad query 362 and the search system is configured to return advertisements having a respective pacing factor that is within the random number. Having a query with a random number and having each advertisement be associated with a pacing factor between "0" and "1" results in the search system sampling the advertisements at the frequency that is equal to, or approximately equal to, the pacing factor corresponding to the advertisements. In one example, an advertisement associated with a pacing factor of 0.1, so the goal is to return that advertisement in response to 10 percent of requests. Assuming 100,000 requests are received, then 10 percent of those requests will be associated with a random number that is between 0 and 0.1, which would therefore allow the system to return the advertisement 10 percent of the time.

In various embodiments, to facilitate this approach, the ad system and/or the search system can adjust the respective bid price of an advertisement to evaluate changes to the pacing factor for that advertisement, for example, in terms of whether the pacing factor gets closer to "0" or closer to "1". If the pacing factor gets close to "0", then the bid price for the advertisement can be decreased so that the advertisement does not show up very often, for example, as an impression. Further, if the pacing factor gets close to "1", then the bid price for the advertisement can be increased so that the advertisement is shown more often, for example, as a result of winning more impressions. An update function can be utilized to facilitate this process by, for example, adjusting the respective pacing factors for advertisements based on the corresponding number of impressions and bids for a particular advertisement. Such adjustment for an advertisement can be performed, for example, by computing an error between the number of times the advertisement has been shown as an impression, and the number of times the advertisement is supposed to be shown as an impression.

Figure 4:
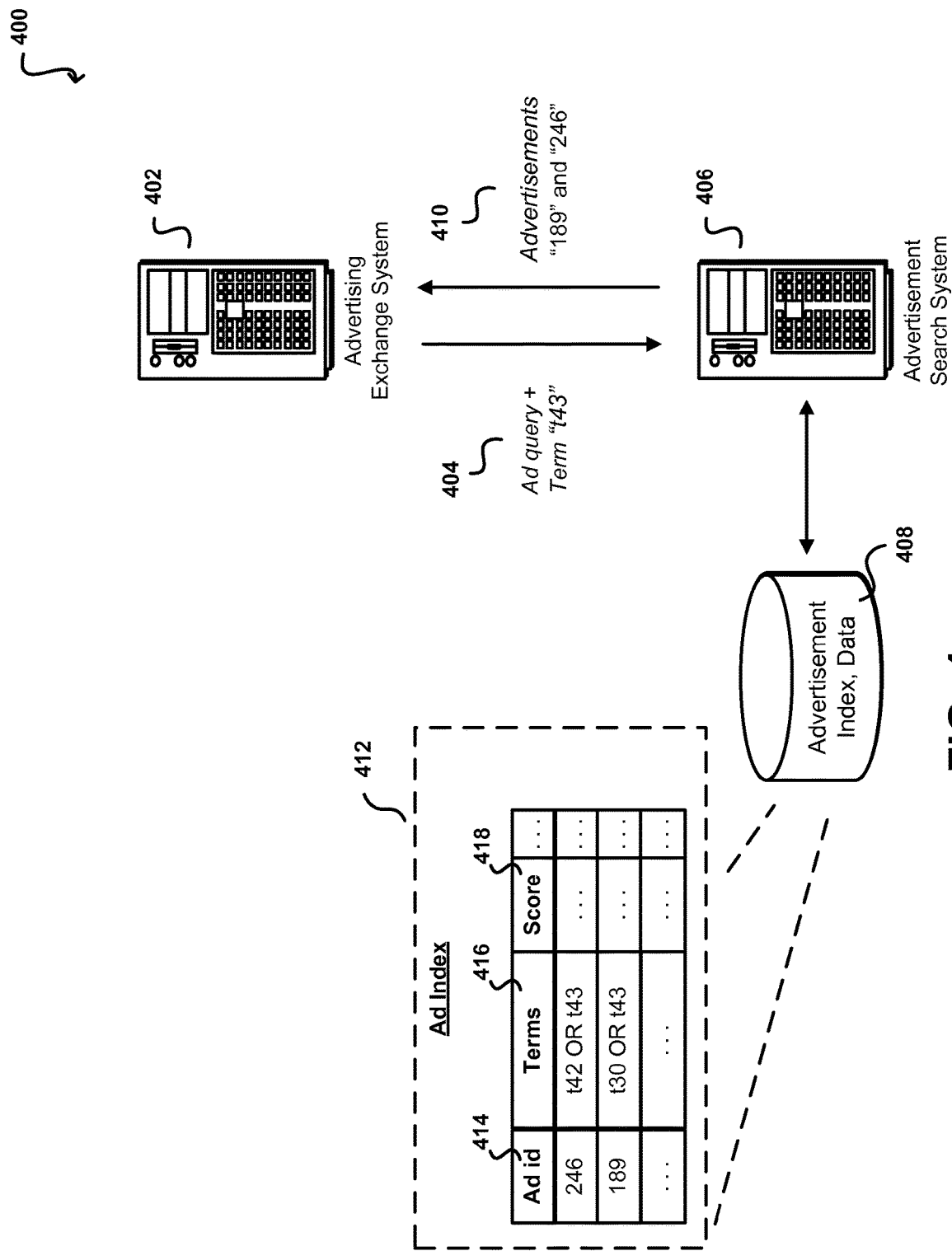
FIG. 4 illustrates an example approach for generating a response to an advertisement query in accordance with various embodiments.

FIG. 4 illustrates an example approach 400 for generating a response to an advertisement query in accordance with various embodiments. FIG. 4 illustrates the advertising system ("ad server") 402 and the advertisement search system ("search system") 406 as described above.

As mentioned, the search system 406 can determine advertisements that are responsive to an ad query 404 and can send the responsive advertisements, or advertisement identifiers, 410 along with other information (e.g., respective bid prices for the advertisements) to the advertising system 402. In various embodiments, the advertisements determined to be responsive can be associated with respective scores and such scores can be used to determine respective bid prices for the advertisements, for example, as well as to rank the advertisements. In various embodiments, the terms determined for segments, as described above, may be associated with respective weights and such weights can be applied to the terms in the ad query 404. Alternatively, the weights may be applied to the terms associated with the advertisements, for example, as part of the index 412. The score can be determined, for example, by taking a product between the ad query and the advertisement. Next, a ranking function can be applied to the advertisements determined to be responsive to the ad query 404. The ranking function can be defined using historical data (e.g., click feedback, purchase feedback, etc.) so that a score 418 for an advertisement is associated with a probability that the advertisement will be clicked. This information can be incorporated into the function so that the function maps a score, for example, that is included in the index 412, to a probability of clicks and/or purchases, depending on the implementation. For any given advertisement, this probability can be multiplied by the respective bid price thereby resulting in an expected cost per impression that can be used to compute the final bid price, and, ultimately, to rank the advertisements.

In various embodiments, the ad system 402 and/or the search system 406 can determine respective boosting factors for advertisements, for example, by using historical click feedback and/or purchase feedback to determine the rate or percentage of clicks and/or purchases when an advertisement was returned for a user having certain segments and/or satisfying certain targeting expressions. Such analysis can determine, for example, how valuable a targeting expression was in computing a click and/or purchase.

Although the example index 412 is shown as including respective terms 416 and scores 418 associated with the advertisement identifier 414, depending on the implementation, the index 412 can be configured to include other types of information corresponding to the advertisements. For example, such information may include, for an advertisement, the size of the advertisement, bid price, frequency cap, pacing factor, prior CTR score, prior ranking score, etc. Optionally, the index can also include, for each advertisement, the number of impressions, clicks, bids, however, such information may be stored separately outside the index in a data store. In some implementations, such advertisement information may be continually updated, for example, and be used to compute updates for purposes of pacing, scoring, etc.

Figure 5:
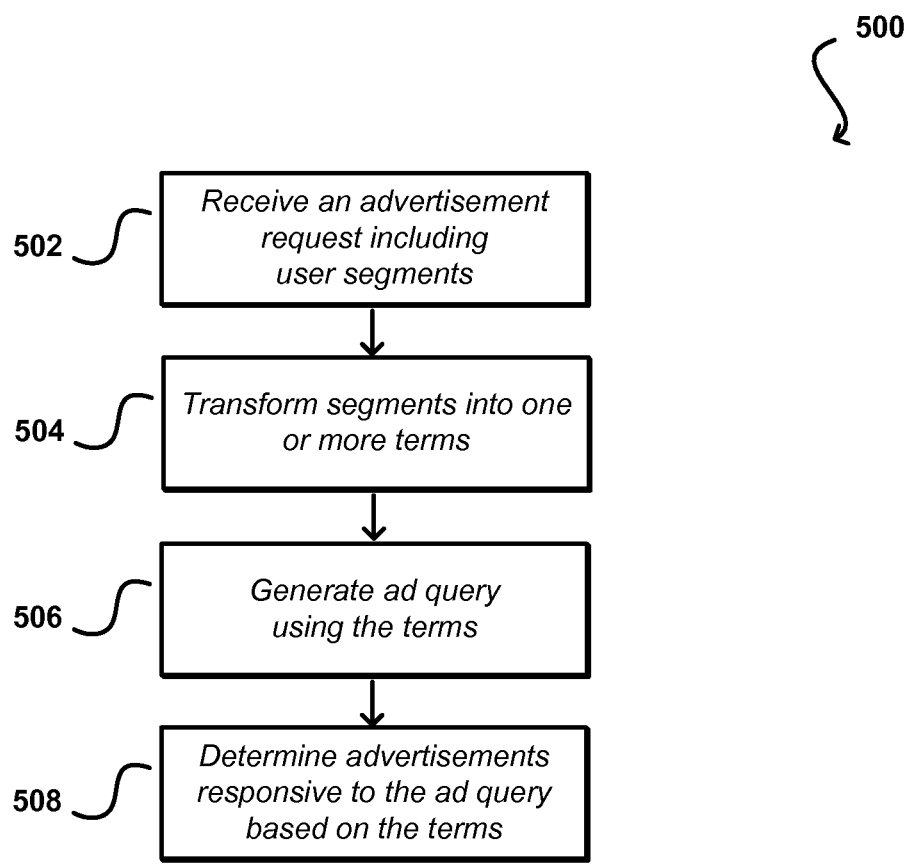
FIG. 5 illustrates a flow diagram of an example process for processing advertisement queries in accordance with various embodiments.

FIG. 5 illustrates a flow diagram of an example process 500 for processing advertisement queries in accordance with various embodiments. The example process 500 is provided merely as an example and additional or fewer steps may be performed in similar or alternative orders, or in parallel, within the scope of the various embodiments described in this specification. A computing device (e.g., ad exchange or ad network) receives 502 a request for one or more advertisements, for example, from a publisher. The request can be sent from a computing system of a publisher through which a user operating a computing device is accessing content, for example, and the request may include various segments associated with the user, as described above.

The computing system can use such information to identify or obtain advertisements that are responsive to the segments provided with the request by converting or transforming 504 segments included in the request into one or more terms. For example, the segments "male" and "photography" included in the ad request may be transformed into a term "t43." The computing system can then generate 506 an advertisement query using the terms. For example, the computing system can generate a query that references the term "t43" and can send the query to an advertisement search system. In some embodiments, the computing system and the advertisement search system are implemented together in one or more computing systems. In this example, the search system can access an advertisement index to determine any advertisements that are associated with a term that matches the term "t43" included in the ad query. Advertisements that match this criteria can be determined 508 to be responsive to the ad query. In various embodiments, respective ranking criteria such as a likelihood of click, purchase, or some other criteria, can be associated with the advertisements determined to be responsive and such criteria may be evaluated by the computing device to determine which advertisement to bid on, for example, in an electronic auction being held to fulfill the advertisement request.

Figure 6:
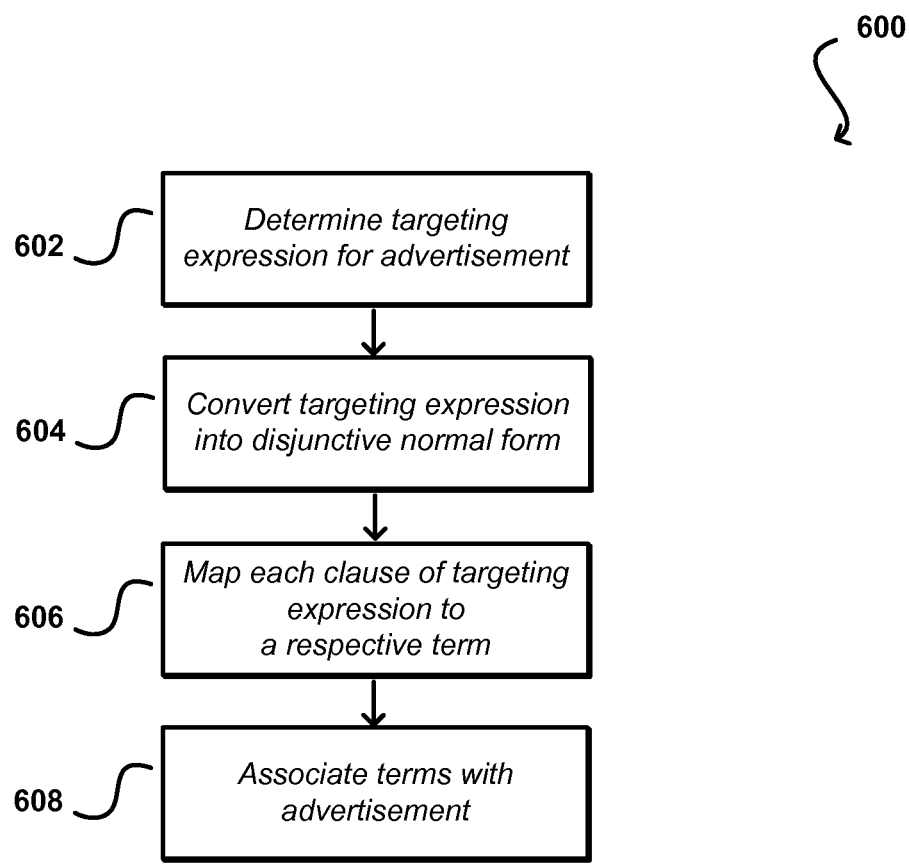
FIG. 6 illustrates a flow diagram of example process for associating a user to an advertising model in accordance with various embodiments.

FIG. 6 illustrates a flow diagram of an example process 600 for generating an advertisement index in accordance with various embodiments. The example process 600 is provided merely as an example and additional or fewer steps may be performed in similar or alternative orders, or in parallel, within the scope of the various embodiments described in this specification.

A computing device (e.g., ad search system) can determine 602, for each advertisement that is available to be served by the computing device, a respective targeting expression for that advertisement. As mentioned, the targeting expression is typically a Boolean logical statement made up of segments and such a statement can be used to target the advertisement to users having segments that satisfy the expression. For example, an advertisement may be associated with a targeting expression "female AND aged 25-35," which targets users that are female and between the ages of 25 and 35.

The computing device can convert 604 the targeting expression into a disjunction of conjunctions such as by standardizing the targeting expression into a disjunctive normal form (DNF). In one example, the logical statement targeting males that are interested in traveling or males that are not over the age of 54 can be formulated as "(male & (traveler|! over age 54))." This logical statement is then rewritten in disjunctive normal form as "male AND traveler OR male AND not over age 54." In this example, the logical statement in disjunctive normal form forms two AND clauses: "male AND traveler" and "male AND not over age 54."

The computing device can map 606 each clause of the targeting expression to a term. For example, in various embodiments, each AND clause is mapped or transformed into a corresponding term referencing that AND clause. In this example, the clause "male AND traveler" may correspond to the term "t38" and the clause "male AND not over age 54" may correspond to the term "tc3." The computing system can repeat this process for some or all of the available advertisements. The computing device can associate 608 the terms derived from the targeting expression with the advertisement. These associations between advertisements and respective terms can be stored as an index for determining advertisements that are responsive to any terms that are referenced in an ad query.

Figure 7:
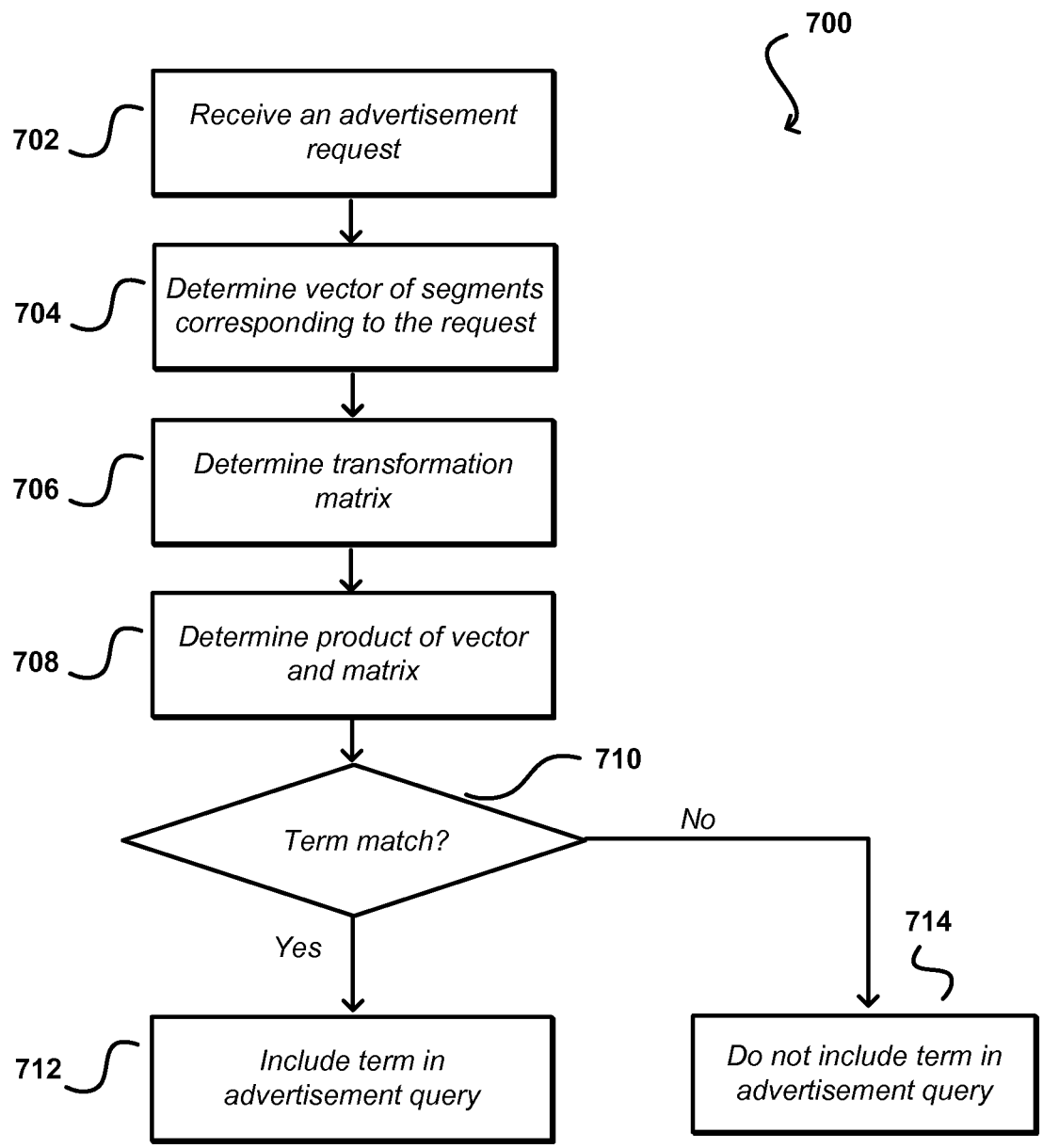
FIG. 7 illustrates a flow diagram of example process for generating an advertisement search query in accordance with various embodiments.

FIG. 7 illustrates a flow diagram of an example process 700 for generating an advertisement index in accordance with various embodiments. The example process 700 is provided merely as an example and additional or fewer steps may be performed in similar or alternative orders, or in parallel, within the scope of the various embodiments described in this specification.

A computing device (e.g., ad system) can receive 702 an advertisement request, for example, from computing systems of publishers. In some implementations, the ad request may include, for example, various information about a user being targeted with advertisements such as behavioral or user segments describing various attributes. In some implementations, the ad request may reference user information (e.g., a user identifier) and such information can be used to obtain additional details about the user. For example, the user information may reference a user identifier that can be used to access or obtain a digital profile corresponding to the user.

Further, this digital profile may store information about the user being targeted with advertisements such as behavioral or user segments describing various attributes of the user. As mentioned, the computing device can convert or transform any segments included in the request into one or more terms. The transform the segments into terms, the computing device can determine 704 a vector of segments. The vector can indicate which segments were included in the ad request, for example, by setting the elements corresponding to any segments that appeared in the ad request to "1" and the elements corresponding to any segments that did not appear in the ad request to "0," as described above.

The computing device can also determine 706 a transformation matrix based on the various Boolean targeting expressions or logical statements that were evaluated for the advertisements, as described above, to determine the terms corresponding to those advertisements. Generally, the transformation matrix is a mathematical representation of the Boolean targeting expressions or logical statements that were mapped or transformed into terms. The transformation matrix can include a column entry for each term that was determined from evaluating the advertisements. The transformation matrix can also include a row entry for each segment that is active or available for targeting.

For each term in the matrix, all positive segments in the column can be defined so the sum of the positive segments normalizes to "1". Similarly, all negative segments in the column can be defined so the sum of the negative segments normalizes to "−1". As mentioned, for any given term, a segment is identified as being positive if that segment is required to be present in the ad request in order for the targeting expression associated with that term to be satisfied. Further, for any given term, a segment is identified as being negative if that segment is required to not be present in the ad request in order for the targeting expression associated with that term to be satisfied.

To determine whether the segments in the ad request match any terms, the computing system can determine 708 a product, of the vector and the transformation matrix. The result of the product can be used to determine 710 whether the segments match any terms. In various embodiments, the result includes respective elements that correspond to each of the terms in transformation matrix and if the element corresponding to the term in the result has at least a value of at least "1," then that term is determined 712 to match the segments in the ad request. The matching terms can be included in the ad query to be used for obtaining advertisements that are responsive to the terms. Otherwise, if the element corresponding to the term in the result is less than "1," then that term is determined 714 not to match the segments in the ad request and these terms are left out of the ad query.

Figure 8:
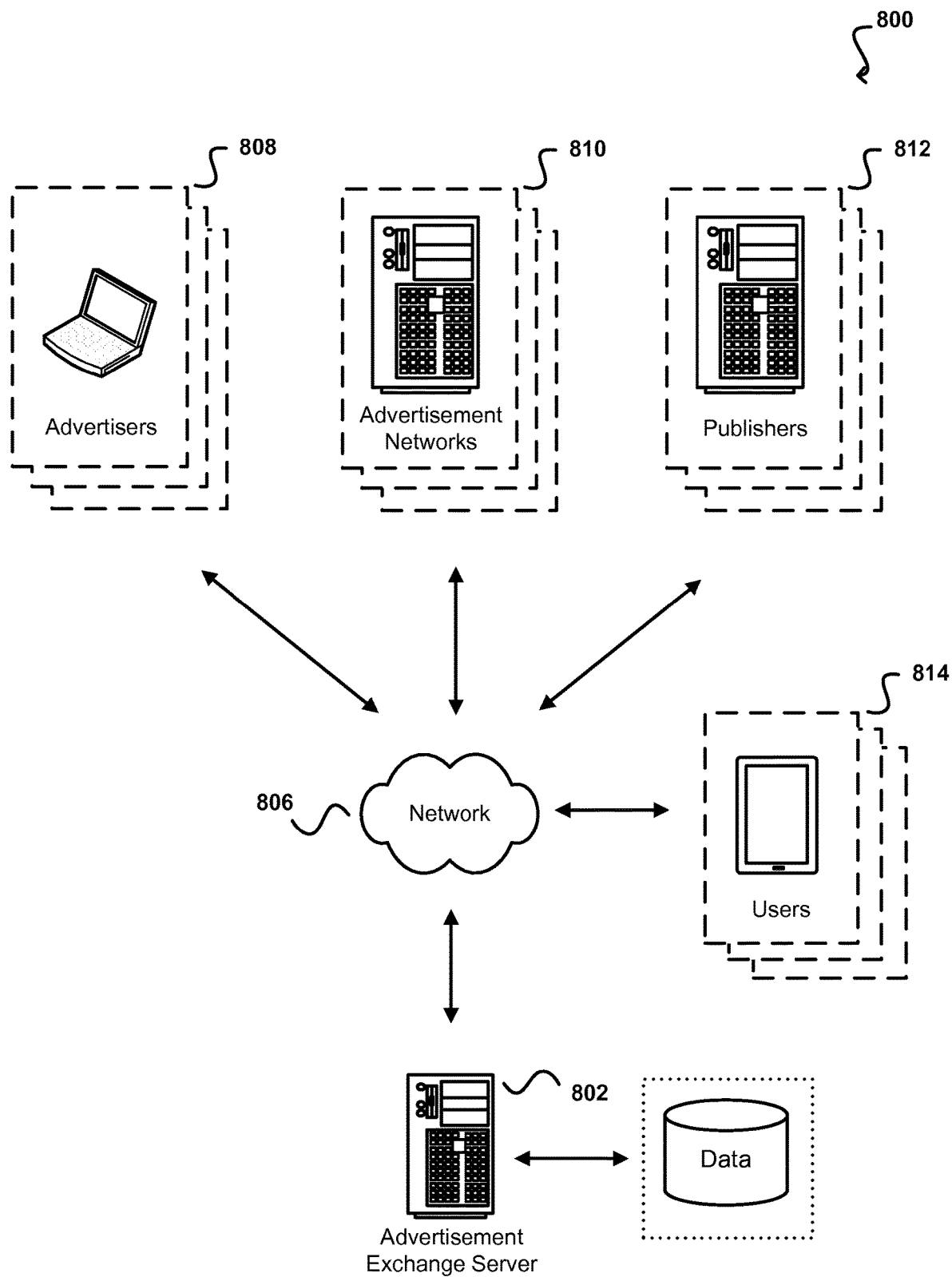
FIG. 8 illustrates an example environment for implementing aspects in accordance with various embodiments.

FIG. 8 illustrates an example environment 800 for implementing aspects in accordance with various embodiments. As mentioned, states of advertising models can be associated with advertising information which may include actual advertisements or information describing advertisements. Such advertising information can be utilized to provide users with targeted, relevant, advertisements. In various embodiments, there may be multiple advertisements associated with a state. To determine which advertisement(s) to present to the user, for example, when an advertising request is received from a publisher, an electronic auction may be conducted, as described below.

In FIG. 8, the example environment 800 includes an electronic content exchange server (e.g., "ad exchange") 802, advertisers 808, advertisement networks 810 ("ad networks"), content publishers (e.g., websites) 812, and users 814 of users accessing content publishers. The ad exchange 802 may be in communication with the advertising system described in reference to FIG. 1 or the ad exchange 802 and the advertising system of FIG. 1 may be implemented together using one or more computing systems. Advertisers 808, ad networks 810, and publishers 812 are able to utilize respective computing systems and/or devices to interact with the ad exchange 802 through the network 806, for example, a local area network (LAN) or wide area network (WAN), e.g., the Internet. Similarly users 814 are able to utilize their respective computing devices to access content (e.g., websites) that may be offered through the publishers 812 over the network 806. Such publishers 812 can provide content (e.g., web pages, etc.) that is accessible over the network 806 (e.g., the Internet). For example, a publisher 812 may utilize one or more computing systems to provide a website that is accessible through the network 806. The publisher's website may offer opportunities to present additional content to users accessing the website, for example, in the form of electronic advertisements. The computing devices and/or systems for each of the ad exchange 802, advertisers 808, ad networks 810, publishers 812, users 814 will each generally include memory for storing instructions and data, and at least one processor for executing the stored instructions.

Typically, when a user 814 utilizes a computing device to access content from the publisher 812, the publisher's system can send, to the ad exchange 802, a request for an advertisement to be presented with the content being accessed by the user, as described above. This request can include various information about the publisher 812 (e.g., type of content being provided, etc.), the user 814 (e.g., gender, age group, interests, etc.), and/or other contextual information (e.g., any search terms in a query submitted by the user, etc.) including a user identifier and/or digital profile, etc. Typically, the ad exchange 802 can facilitate an electronic auction among the advertisers 808 and/or ad networks 810 to automatically determine which advertisement should be provided to the publisher's system in response to the advertisement request. Such an auction can generally be performed automatically among advertisers that have advertisements associated with a respective estate corresponding to one or more advertising models that are associated with the user 814. Once the auction is complete, the winning advertisement is provided to the publisher's system in response to the advertisement request to be displayed, as an impression, with the publisher's content. The publisher's system can then provide the advertisement together with the content being browsed by the user 814. Various payment approaches may be utilized to pay the publisher. For example, a portion of the bid price can be paid to the publisher per impression (i.e., cost per impression or cost per mille), per click (i.e., cost per click), per conversion, etc.

Figure 9:
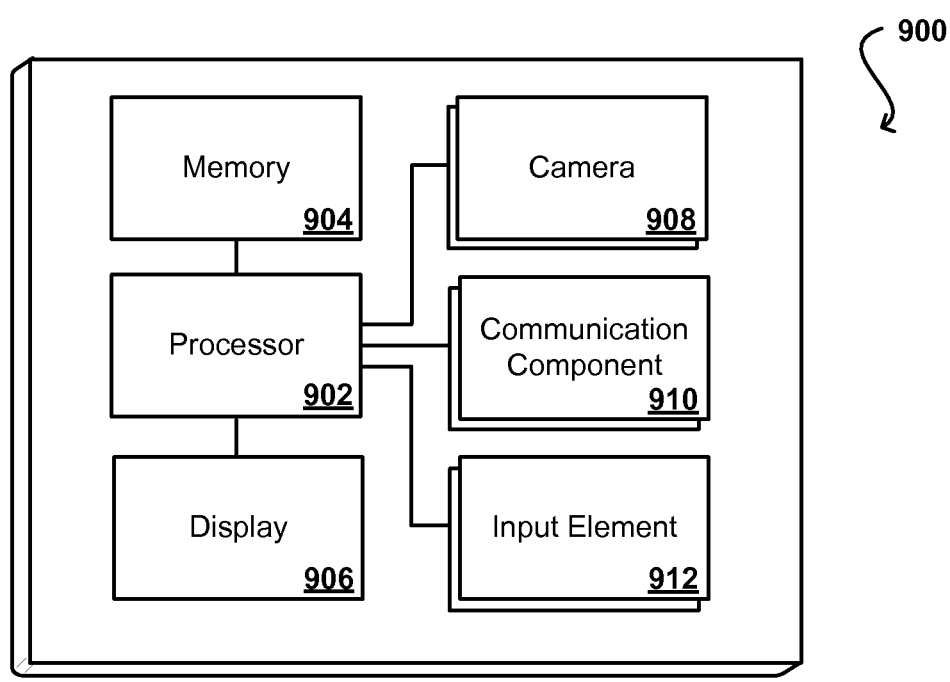
FIG. 9 illustrates example components of a computing device.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element 908 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 912, such as a mono or stereo microphone or microphone array, operable to capture audio information from at least one primary direction. A microphone can be a uni-or omni-directional microphone as known for such devices.

In some embodiments, the computing device 900 of FIG. 9 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor 910. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 10:
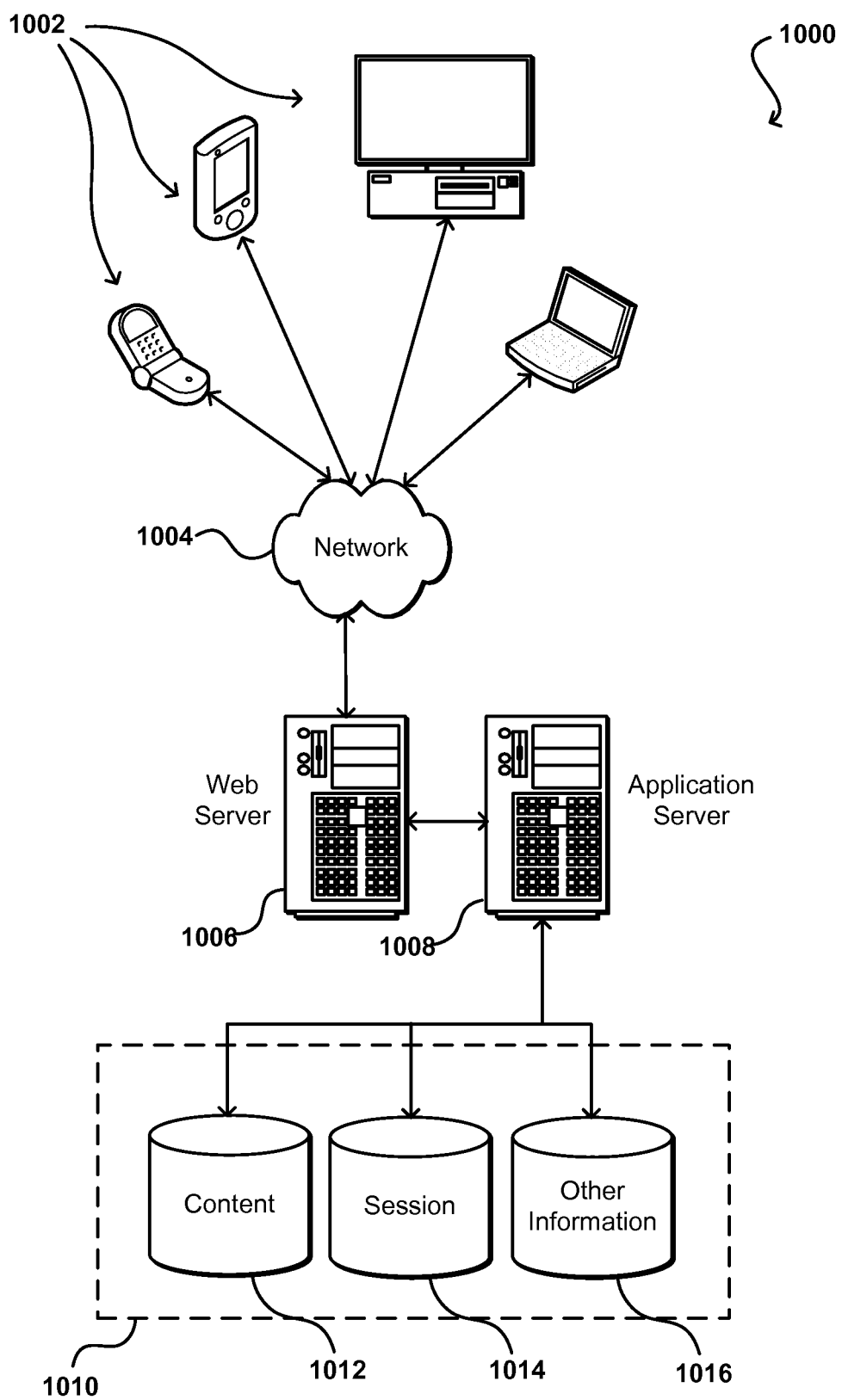
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and other information 1016 (e.g., anonymized user information), which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   generating an advertisement search index that associates each of a plurality of advertisements with one or more respective terms, wherein each advertisement is associated with a Boolean targeting expression for targeting the advertisement to users that are associated with one or more advertisement segments that satisfy the Boolean targeting expression, and wherein each respective term associated with the advertisement corresponds to at least a portion of the Boolean targeting expression;
   receiving a request for a first advertisement from a computing system of a publisher;
   determining, based at least in part on the request, one or more advertisement segments that describe attributes of a first user to be presented with the first advertisement;
   determining a segment vector indicating the one or more advertisement segments referenced in the request;
   determining a transformation matrix that mathematically represents the respective Boolean targeting expressions for each of the plurality of advertisements;
   determining one or more of the terms based at least in part on a product of the segment vector and the transformation matrix;
   generating an advertisement query that references at least the one or more terms;
   determining, based at least in part on the advertisement search index, one or more advertisements that are responsive to the one or more terms referenced in the advertisement query; and
   automatically providing, via a distributed computing environment, the one or more advertisements to the computing system of the publisher, the one or more advertisements being displayed, with content of the publisher, on a client device, the client device including a Global Positioning System (GPS) system or other positioning element operable to determine relative position coordinates describing one or more of the attributes.

2. The computer-implemented method of claim 1, wherein generating the advertisement search index further comprises:
   determining a Boolean targeting expression for an advertisement;
   determining a disjunctive normal form of the Boolean targeting expression, the disjunction resulting in a first subexpression and a second subexpression, wherein each of the first subexpression and the second subexpression correspond to a portion of the Boolean targeting expression;
   determining a mapping of the first subexpression to a first term;
   determining a mapping of the second subexpression to a second term; and
   associating the advertisement with the first term and the second term.

3. The computer-implemented method of claim 1, wherein determining the one or more advertisements further comprises:
   determining that the one or more advertisements satisfy one or more of an advertisement sizing constraint, a respective frequency capping constraint, or a respective pacing constraint.

4. A computing system comprising:
   one or more processors; and
   memory storing instructions that, when executed by the one or more processors, cause the computing system to perform operations, comprising:
   determining one or more targeting segments;
   determining a vector referencing a plurality of segments, the vector identifying the one or more targeting segments;
   determining a transformation matrix, the transformation matrix being a mathematical representation of at least a targeting expression for an advertisement;
   determining at least one term based at least in part on a product of the vector and the transformation matrix;
   determining one or more advertisements, wherein at least one first advertisement in the one or more advertisements is responsive to the at least one term; and
   automatically providing, via a distributed computing environment, the one or more advertisements to a computing system of a publisher, the one or more advertisements being displayed, with content of the publisher, on a client device, the client device including a Global Positioning System (GPS) system or other positioning element operable to determine relative position coordinates describing one or more of attributes of a user.

5. The computing system of claim 4, wherein determining the one or more targeting segments further causes the computing system to perform the operations of:
receiving a request for an advertisement from the computing system of the publisher, the request including information describing the user; and
determining the one or more targeting segments based at least in part on the information describing the user.

6. The computing system of claim 4, wherein determining the at least one term based at least in part on the targeting segments further causes the computing system to perform the operations of:
determining that at least a portion of the targeting segments satisfy targeting expression corresponding to the term.

7. The computing system of claim 4, wherein determining the one or more advertisements further causes the computing system to perform the operations of:
determining at least one respective term associated with the at least one first advertisement; and
determining that the at least one respective term matches the at least one term corresponding to the targeting segments.

8. The computing system of claim 7, wherein determining at least one respective term further causes the computing system to perform the operations of:
determining a targeting expression associated with the at least one first advertisement; and
determining a mapping between at least a portion of the targeting expression and a corresponding term.

9. The computing system of claim 4, wherein determining the one or more advertisements further causes the computing system to perform the operations of:
determining an advertisement search index that associates each of a plurality of advertisements with at least one or more respective terms, wherein each advertisement is associated with a targeting expression, and wherein each respective term associated with the advertisement corresponds to at least a portion of the targeting expression; and
determining the one or more advertisements that are responsive to the at least one term based at least in part on the advertisement search index.

10. The computing system of claim 4, wherein determining the one or more advertisements further causes the computing system to perform the operations of:
determining, based at least in part on a ranking function, an advertisement in the one or more advertisement having a best score.

11. The computing system of claim 4, wherein determining the one or more advertisements further causes the computing system to perform the operations of:
determining that each advertisement in the one or more advertisements satisfies a respective frequency capping constraint for the advertisement.

12. The computing system of claim 4, wherein determining the one or more advertisements further causes the computing system to perform the operations of:
determining that each advertisement in the one or more advertisements satisfies a respective pacing constraint for the advertisement.

13. The computing system of claim 12, wherein the instructions further cause the computing system to perform the operations of:
determining that a respective pacing constraint for an advertisement in the one or more advertisements is not being satisfied; and
adjusting a respective bid price for the advertisement based at least in part on the pacing constraint.

14. A computing system comprising:
one or more processors; and
memory storing instructions that, when executed by the one or more processors, cause the computing device to perform operations of:
receiving a request for an advertisement, the request including information describing a user;
determining one or more advertising segments corresponding to the user;
determining a vector referencing a plurality of segments, the vector identifying the one or more targeting segments;
determining a transformation matrix, the transformation matrix being a mathematical representation of at least a targeting expression for the advertisement;
determining at least one term based at least in part on a product of the vector and the transformation matrix;
automatically determining at least one advertisement query that references the at least one term, wherein one or more advertisements for targeting the advertising segments are able to be determined based at least in part on the advertisement query; and
providing, via a distributed computing environment, the one or more advertisements to the computing system of the publisher, the one or more advertisements being displayed, with content of the publisher, on a client device, the client device including a Global Positioning System (GPS) system or other positioning element operable to determine relative position coordinates describing one or more of attributes of the user.

15. The computing system of claim 14, wherein determining the at least one term based on the advertising segments further causes the computing system to perform the operations of:
determining that the at least one term corresponds to a targeting expression; and
determining that the advertising segments satisfy the targeting expression.

16. The computing system of claim 14, wherein the instructions further cause the computing system to perform the operations of:
obtaining the one or more advertisements based at least in part on the advertisement query, wherein at least one of the one or more advertisements is associated with at least the at least one term.

17. The computing system of claim 16, wherein the one or more advertisements are associated with a respective score, and wherein the instructions further cause the computing system to perform the operations of:
determining a respective bid price for at least one of the one or more advertisements based at least in part on the respective score for the advertisement.

18. The computing system of claim 16, wherein the one or more advertisements obtained satisfy one or more of an advertisement sizing constraint, a respective frequency capping constraint, or a respective pacing constraint.

* * * * *